United States Patent [19]

Haack et al.

[11] 4,230,657
[45] Oct. 28, 1980

[54] METHOD AND APPARATUS FOR PRODUCING ARTIFICIAL GREENERY

[75] Inventors: William M. Haack, St. Louis; Dennis K. Peth, Florissaint, both of Mo.

[73] Assignee: Keene Corporation, New York, N.Y.

[21] Appl. No.: 34,602

[22] Filed: Apr. 30, 1979

[51] Int. Cl.² .................... B29C 25/00; B29C 17/00; B29F 1/00
[52] U.S. Cl. ................................. 264/234; 264/237; 264/243; 264/294; 264/295; 264/322; 425/129 R; 425/547; 425/548; 425/324.1; 425/327; 425/371; 425/468
[58] Field of Search ...................... 428/21, 26, 27, 17, 428/18; 264/320, 322, 328, 329, 237, 345, 348, 234, 294–296; 425/129 R, 327, 335, 340, 371, 324.1, 542, 547, 548, 468

[56] References Cited

U.S. PATENT DOCUMENTS

| 1,929,366 | 10/1933 | McClintock | 428/21 |
| 2,306,835 | 12/1942 | Tucker | 428/21 |
| 3,011,280 | 12/1961 | Keidd | 428/18 |
| 3,050,891 | 8/1962 | Thomsen et al. | 428/18 |
| 3,130,109 | 4/1964 | Harvey et al. | 428/21 |
| 3,167,467 | 1/1965 | Abramson | 428/18 |
| 3,352,960 | 11/1967 | McLaughlin | 264/322 |
| 3,644,164 | 2/1972 | Chin | 428/26 |
| 3,776,676 | 12/1973 | Kessler | 264/329 |

Primary Examiner—W. E. Hoag
Attorney, Agent, or Firm—Kane, Dalsimer, Kane, Sullivan and Kurucz

[57] ABSTRACT

A method and apparatus for molding single stems and buds of greenery in flat form projecting from an elongated strip in one continuous piece, softening and curving the flat piece of spaced stems and buds, and then compressing such piece so that the previous flat sections are curved and repositioned to create conically-shaped interfering buds. The method is carried out by the apparatus disclosed and claimed.

5 Claims, 9 Drawing Figures

U.S. Patent  Oct. 28, 1980  Sheet 1 of 4  4,230,657

METHOD AND APPARATUS FOR PRODUCING ARTIFICIAL GREENERY

BACKGROUND OF THE INVENTION

1. Field of the Invention

The invention relates to the production of plastic greenery for decorative purposes, such as artificial parsley, and more particularly to the formation of stems and buds of greenery projecting from an elongated member with the stems and buds curved and repositioned to create interfering sections.

2. Brief Description of the Prior Art

Plastic greenery strips, such as artificial parsley, have been made and used for several years. They make displays look more appetizing, more flavorful and more saleable. They do everything expected of real greenery with none of the problems. With the trend to longer store hours, real greenery can droop or wilt or fade before the selling day is over. Plastic greenery stays fresh and bright around the clock, day after day, year after year and is less expensive. Furthermore, it is bacteria-free. It frames the produce adding the finishing touch to a picture of appetizing freshness. It can be maintained by periodically sanitizing the parsley and replacing any damaged sprigs and broken holders.

The plastic artificial greenery widely in use is made up of a series of sprigs, each sprig having buds, bud stems and a central stem. Each such sprig is molded separately in a cone shape. The central stem of each sprig is inserted in a hole in an elongated member or strip. Such elongated member has a series of spaced holes to receive a plurality of such sprigs. The end of the central stem going through the hole is enlarged by heat or otherwise so that the stem will not slip out of the elongated member. (See U.S. Pat. No. 3,315,925) Such construction has several disadvantages:

(a) It requires a separate operation to insert each sprig in the hole in the elongated member;

(b) In some cases, when it is necessary to bend the elongated member holding the sprigs, the member cracks or breaks at the holes causing the sprig to fall out.

(c) In most cases the member holding the sprigs does not exceed 15 to 18 inches which requires several to be put together for a display. Because of such short lengths a metal or plastic channel is required to hold a number of members.

The method of the present invention has the following advantages over the artificial greenery now in use:

(a) The buds, stems and elongated member from which the buds and stems project are all molded in one piece to provide a member with a plurality of sprigs of stems and buds.

(b) It permits making such greenery three feet or longer in one piece.

(c) The elongated member of greenery can be inserted into a metal channel (see U.S. Pat. No. 3,315,925) or can be used without such metal channel. The base of such member can be made of any width to fit a customer's needs. Such member can be made to fit into the divider holders which are placed in the stands holding the displays.

(d) Since the elongated member from which the stems and buds project is a solid member with no holes there are no stress points such as in the greenery now in use. Consequently the member can be curved without breaking or damage.

Artificial greenery is shown in various patents such as U.S. Pat. Nos. 1,898,769; 3,130,109; 3,318,755 and 3,644,164. Injection molding is disclosed in U.S. Pat. Nos. 2,416,451; 2,450,448; 2,263,894; 2,879,617; 2,901,852; 3,644,164 and 3,776,676. U.S. Pat. No. 3,352,960 discloses molding, heating, bending and cooling of a tubular piece of thermoplastic material. However, this prior art does not disclose the method described and claimed herein for the production of plastic greenery.

SUMMARY OF THE INVENTION

The invention covers a method for producing plastic greenery, such as artificial parsley. The method comprises:

molding in plastic an elongated member from which project a plurality of sprigs of stems and buds spaced along the member with stems and buds generally parallel to each other;

passing the elongated member and interconnected stems and buds through a hot water spray to soften and reorient the stems and buds; and compressing the said stems and buds between two moving platens until the plastic cools to allow the stems and buds to be repositioned into interfering circles;

whereby the plastic greenery resembles real greenery.

DETAILED DESCRIPTION OF THE PREFERRED EMBODIMENT OF THE INVENTION

Figure 1:
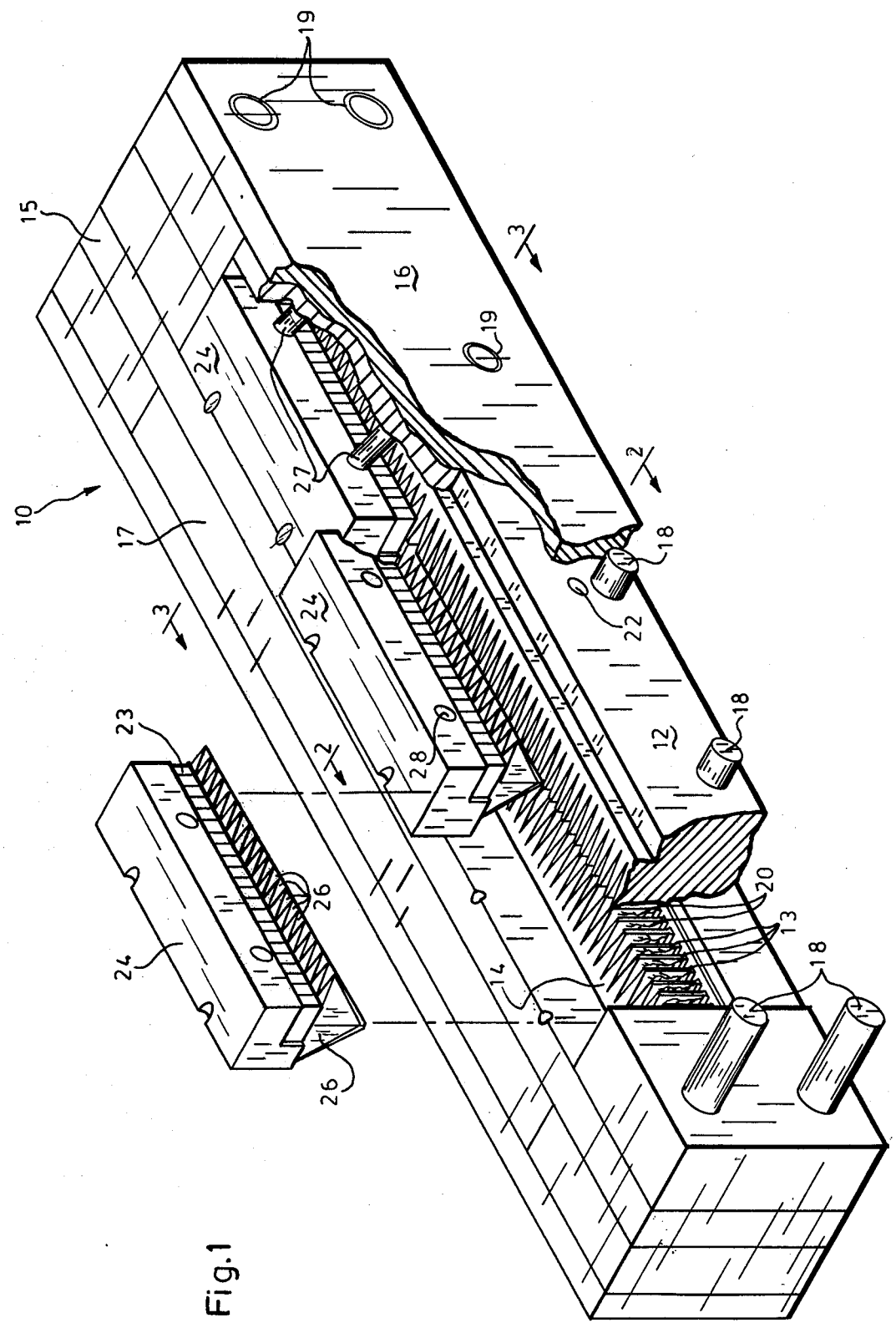
FIG. 1 is an isometric view partially broken away of the mold used to produce the artificial greenery according to the method of the present invention, showing the male core in three sections with one section having the male core fully engaging the two female sections, a second section having the male core prior to engaging the female cores, and a third section having the male core above the female cores.
Figures 2, 6, 6A, 8:
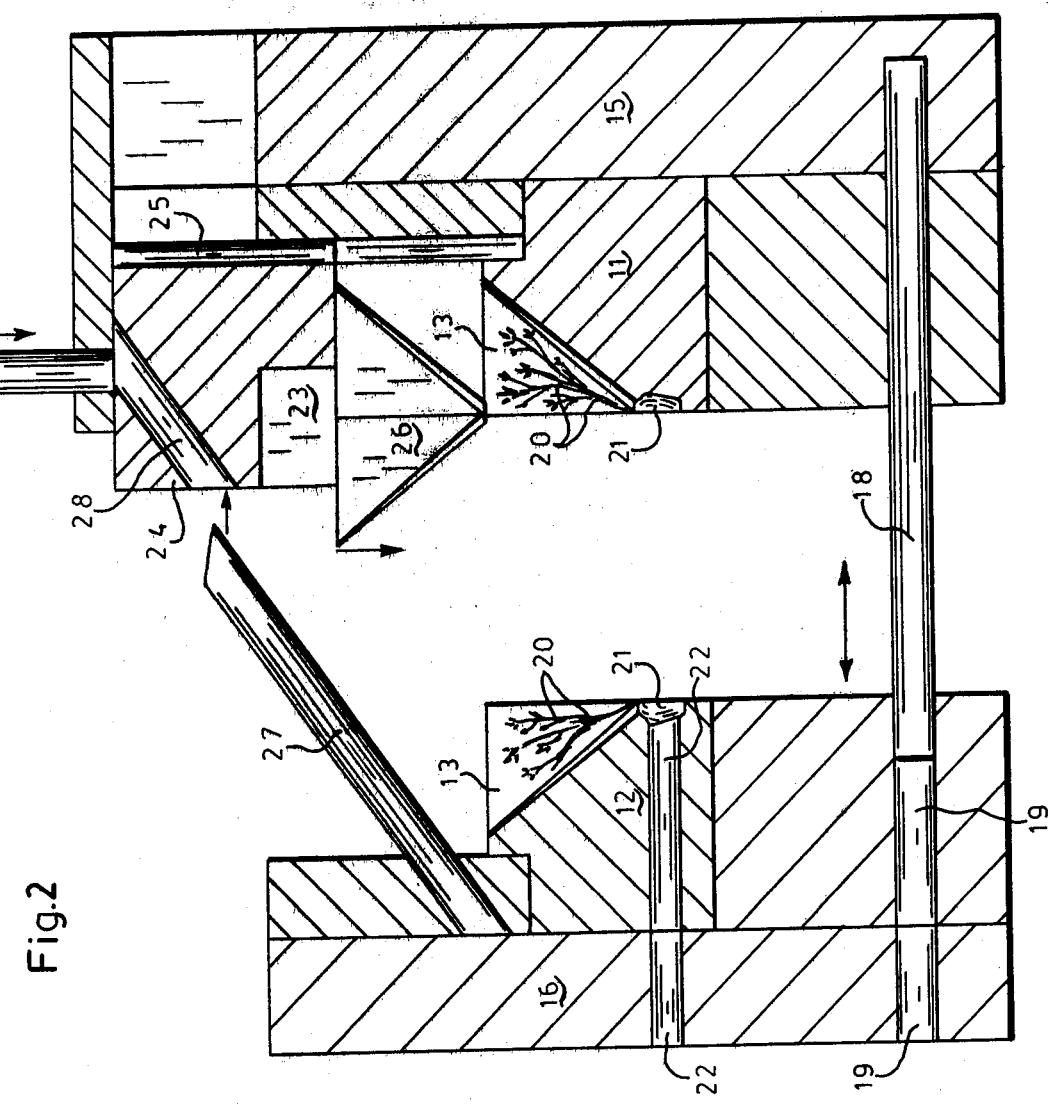
FIG. 2 is a sectional view along the line 2—2 of FIG. 1 but with the female cores separated.
FIG. 6 is a side view of a sprig of the stems and buds and a portion of the elongated member as it comes from the mold of FIG. 1 showing the flat sides of the sprig which were against the blade of the male core and the raised sides which were in the cavities of the female cores.
FIG. 6A is an enlarged sectional view along the line 6A—6A of FIG. 6.
FIG. 8 is a perspective view of the finished artificial greenery as it comes from the equipment of FIG. 7.

Referring to the drawings there is shown in FIG. 1 a mold 10 for carrying out the method of the present invention to produce artificial greenery. Such mold embodies two female cores 11 and 12 which are shown together but are adapted to be separated from each other as is shown in FIG. 2. Each female core is made up of a plurality of walls 13 which define V-shaped triangular slots 14. As the two female cores are brought together into tight engagement the V-shaped slots of each core come together to form a plurality of female slots adapted to receive a plurality of triangular blades of the male core. Such female slots are triangular in shape with the apex of the triangle at the bottom of the slot. The female cores have affixed thereto plates 15 and 16 with the plate 15 of the core 11 affixed to a frame member 17. Projecting from the female core 11 are a plurality of guide rods 18 adapted to mate with a plurality of guide holes 19 in the female core 12. These guide rods and holes serve to align the female cores and insure that the two female cores and slots will be in registry when the cores are brought together.

The walls 13 in each female core are engraved to define cavities 20 in the shape and form of the stems and buds of the greenery to be produced (FIG. 2). As illustrated and described herein the engraving is in the walls of the female core. However, the cavities could be engraved in the blades of the male core or in both the walls of the female cores and in the blades of the male core. The cavities 20 engraved in the walls 14 extend to the bottoms of the triangular slots formed by the mating female cores and connect with a channel 21 running the full length of the female cores (FIG. 3) and formed by the two cores. Connected to the channel 21 is a passageway 22 running through the female core 12 and plate 16. Such passageway is adapted to receive the molder nozzle of an extruder so that plastic can be fed into the channel 21 and the cavities 20 defined between the wall 13 of the slots 14 in the female cores and the blades of the male core.

Figure 4:
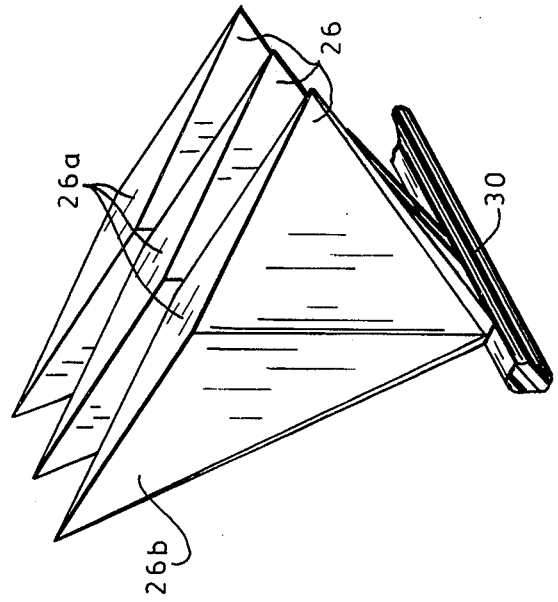
FIG. 4 is a perspective view of some of the blades of the male core.
Figure 5:
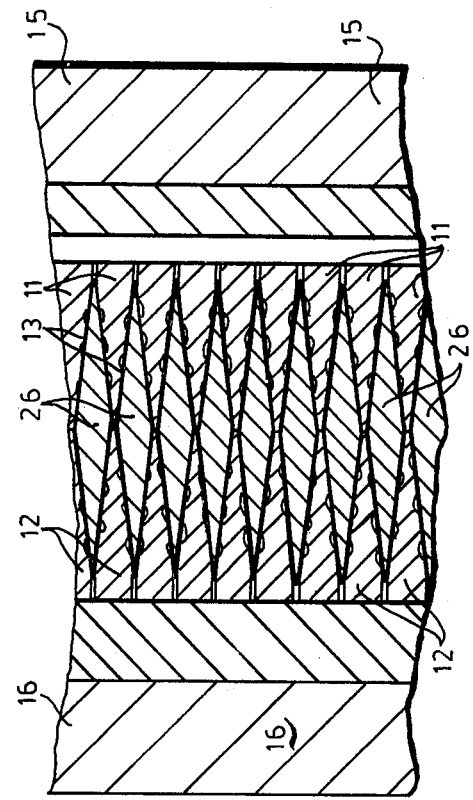
FIG. 5 is a sectional view along the line 5—5 of FIG. 3.
Figure 3:
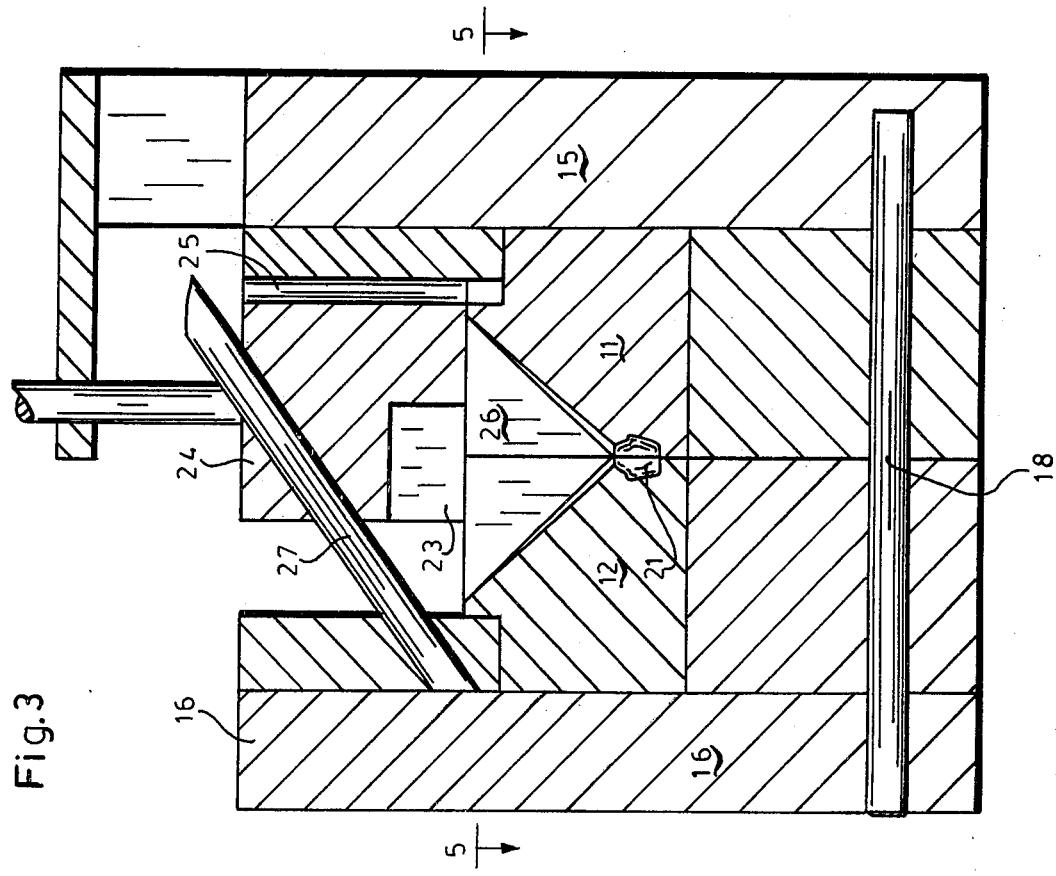
FIG. 3 is a sectional view along the line 3—3 of FIG. 1.

Also embodied in the mold 10 is a male core 23 which is shown in three sections (FIG. 1). Such core can be made in a single section, but it has been found advantageous from the standpoint of handling and registry to form it in a plurality of sections. The core is affixed to a support 24 which is connected to the female core 11 by a series of mating T-shaped male and female members 25 which permit the core to slide up and down with relation to the female core 11. The male core is made up of a plurality of triangular blades 26 which taper from a thickened center portion 26a toward knife edges 26b (FIG. 4). The contour of these blades match the slots 14 formed by the walls 13 of the female cores. When the male core is moved downward and completely engages the mating female cores as shown in FIG. 3, the blades 26 completely seal the slots 14 leaving only the cavities 20 and the channel 21 (FIG. 5). Thus the plastic when fed into the molds will fill only such cavities and the channel.

The female cores and male core are initially in the relative positions shown in FIG. 2. As the female core 12 is moved toward female core 11 the slanted rods 27 projecting upward from the plate 16 engage matching slanted holes 28 in the male core support 24 (FIGS. 2 and 3). Such rods 27 and holes 28 serve to move the male core downward until the female cores are completely together and the blades of the male core are fully inserted in the slots of the female cores (FIG. 3). There is a holddown bar or other conventional means (not shown) on the male core to prevent such core from lifting out of position when the plastic under pressure is forced into the mold. The molds are now ready to receive the plastic.

The plastic used is the standard material for the artificial greenery now on the market, for example ethylene vinyl acetate copolymer (EVA) such as DuPont 3154, 3172 or 3124. If increased rigidity is required, a low density polyethylene can be used as a mechanical additive with the EVA to provide such rigidity. The plastic and the mold heretofore described are well know and conventional.

When the cores are separated and the plastic greenery is removed from the mold it is in the form shown in FIG. 6. Each blade 26 and mating slot 14 form four sets of stems and buds designated as a sprig 29 with the stems and buds substantially parallel to each other (FIG. 6). A plurality of such sprigs 29 are connected to the strip 30 which may be three feet or longer depending on the size of the mold. Since the stems and buds are not acceptable in such condition it is necessary to reorient the stems and buds to give them the three dimensional natural look of real greenery.

Figure 7:
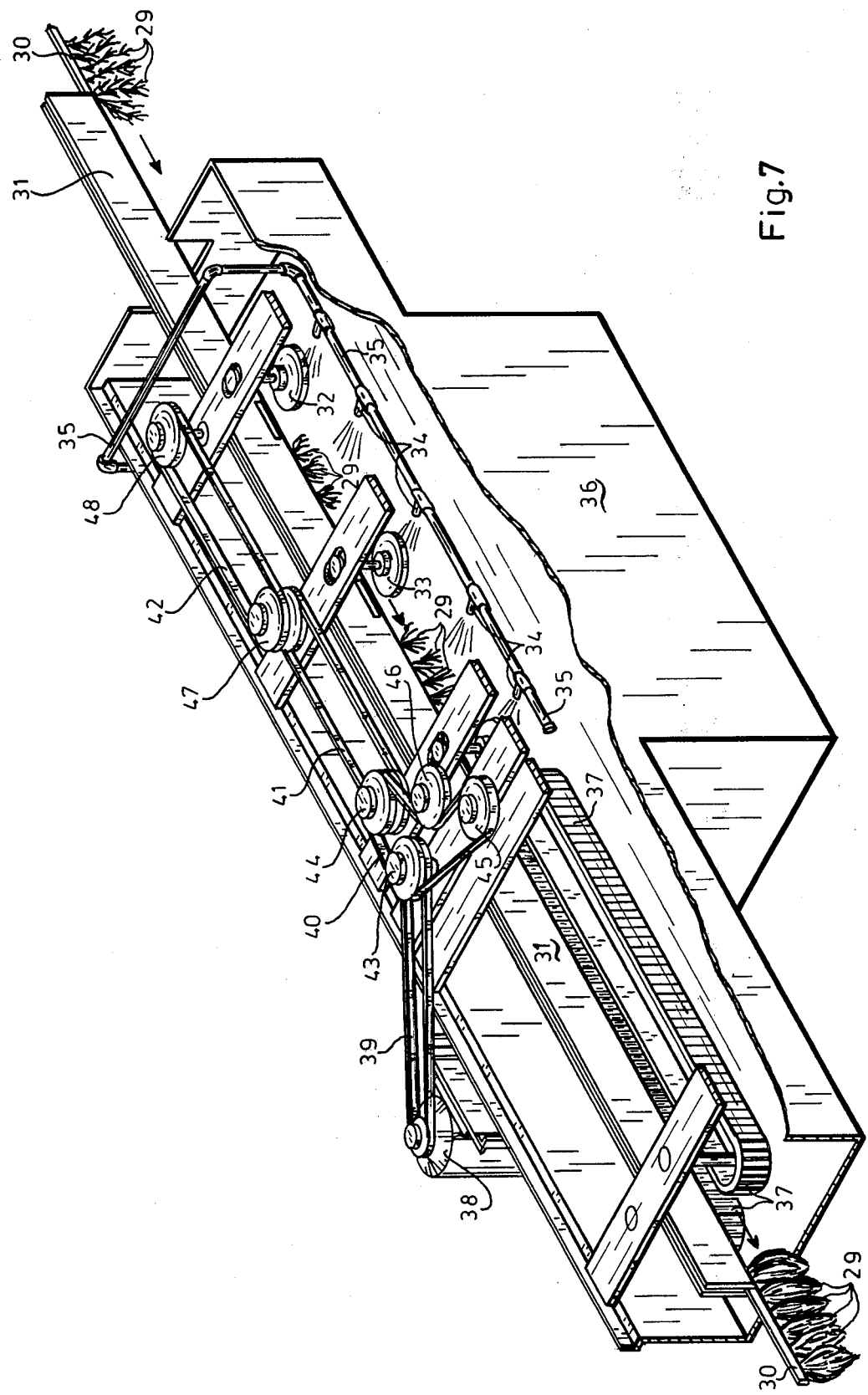
FIG. 7 is an isometric view of the equipment for carrying out the steps of softening, deforming and compressing the stems and buds of the artificial greenery.

Each strip 30 of stems and buds is run through the equipment shown in FIG. 7. Such equipment embodies a guide 31 running almost the length of the machine. This guide is sized to receive the strip 30 of the greenergy in inverted position with the stems and buds projecting downwardly. The strip is fed into the guide until the strip engages a first set of continuously driven rollers 32 which move the strip along the guide. A similar set of rollers 33 further along the guide likewise move the strip along the guide. As the strip with the stems and buds projecting downwardly moves through the machine a series of hot water sprays on each side drive the water against the stems and buds. Such sprays emanate from nozzles 34 along a water line 35 connected to a hot water reservoir 36. The water should be hot enough to soften, deform and shape the buds and stems into a conical shape. It has been found that a water temperature ranging from 160°-200° F. operates satisfactorily.

After the softened buds and stems pass through the hot water spray they are fed between two continuously moving flat top chains 37 which serve as platens to compress the buds and stems and allow them to cool while moving the strip toward the exit end of the machine. The chains 37 and the rollers 32 and 33 are driven from a motor 38 by means of a series of drive belts 39, 40, 41, and 42 running over a series of pulleys 43, 44, 45, 46, 47 and 48.

As the greenery exits from the flat top chains 37 the buds and stems spring outward slightly to give a finished product of conically-shaped interfering buds similar to the artificial greenery now on the market and to real greenery. FIG. 8 illustrates the appearance of such finished product.

Those skilled in the art will appreciate that many variations of the above described embodiment of the invention may be made without departing from the spirit and the scope of the invention.

What is claimed:

1. The method of producing plastic greenery for decorative purposes, such as artificial parsley, comprising molding in plastic an elongated member from which project a plurality of sprigs of stems and buds spaced along the member with the stems and buds generally parallel to each other;

passing the elongated member and interconnected stems and buds through a hot water spray to soften and reorient the stems and buds; and comprising the said stems and buds between two moving platens until the plastic cools to allow the stems and buds to be repositioned into conically-shaped interfering shapes;

whereby the plastic greenery resembles real greenery.

2. The method of claim 1 in which the stems and buds are passed through a plurality of sprays.

3. The method of claim 1 in which the temperature of the water in the hot water spray ranges between 160° and 200° F.

4. The method of claim 1 in which the moving platens comprise two continuously moving flat top chains.

5. A machine for producing artificial greenery for decorative purposes, such as artificial parsley, comprising:

means for molding in plastic an elongated member from which project a plurality of sprigs of stems and buds spaced along the member with the stems and buds generally parallel to each other;

a hot water spray to soften and reorient the stems and buds;

a hot water reservoir with means to feed the hot water to the spray;

means to convey the elongated member and stems and buds past the hot water spray;

means to compress the stems and buds until the plastic cools to allow the stems and buds to be repositioned into conically-shaped interfering shapes;

means to convey the elongated member and sprayed stems and buds through the compression means;

whereby the plastic greenery coming from the machine resembles real greenery.

* * * * *

UNITED STATES PATENT AND TRADEMARK OFFICE
CERTIFICATE OF CORRECTION

PATENT NO. : 4,230,657
DATED : October 28, 1980
INVENTOR(S) : WILLIAM M. HAACK and DENNIS K. PETH It is certified that error appears in the above—identified patent and that said Letters Patent is hereby corrected as shown below:

In claim 1, column 5, line 4, "comprising" should be --compressing--.

Signed and Sealed this

Tenth Day of February 1981

[SEAL]

Attest:

RENE D. TEGTMEYER

Attesting Officer    Acting Commissioner of Patents and Trademarks